United States Patent
Keoh et al.

(10) Patent No.: US 9,185,133 B2
(45) Date of Patent: Nov. 10, 2015

(54) METHODS, DEVICES AND SYSTEMS FOR ESTABLISHING END-TO-END SECURE CONNECTIONS AND FOR SECURELY COMMUNICATING DATA PACKETS

(75) Inventors: Sye Loong Keoh, Eidhoven (NL); Oscar Garcia Morchon, Aachen (DE); Sandeep Shankaran Kumar, Waalre (NL); Martina Brachmann, Dresden (DE); Bozena Erdmann, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/234,451

(22) PCT Filed: Jul. 24, 2012

(86) PCT No.: PCT/IB2012/053759
§ 371 (c)(1),
(2), (4) Date: Jan. 23, 2014

(87) PCT Pub. No.: WO2013/014609
PCT Pub. Date: Jan. 31, 2013

(65) Prior Publication Data
US 2014/0143855 A1      May 22, 2014

Related U.S. Application Data

(60) Provisional application No. 61/511,166, filed on Jul. 25, 2011, provisional application No. 61/635,490, filed on Apr. 19, 2012.

(51) Int. Cl.
*G06F 12/00* (2006.01)
*H04L 29/06* (2006.01)

(52) U.S. Cl.
CPC ................................ *H04L 63/166* (2013.01)

(58) Field of Classification Search
None
See application file for complete search history.

(56) References Cited

U.S. PATENT DOCUMENTS

| | | | |
|---|---|---|---|
| 2003/0097592 A1* | 5/2003 | Adusumilli | 713/201 |
| 2007/0094723 A1 | 4/2007 | Short et al. | |
| 2010/0031042 A1 | 2/2010 | Di Crescenzo et al. | |
| 2011/0141904 A1* | 6/2011 | Viger et al. | 370/241 |
| 2011/0296520 A1* | 12/2011 | Erofeev | 726/14 |
| 2012/0198037 A1* | 8/2012 | Shelby et al. | 709/223 |
| 2014/0143855 A1* | 5/2014 | Keoh et al. | 726/14 |

* cited by examiner

*Primary Examiner* — Nirav B Patel
*Assistant Examiner* — Mohammed Waliullah
(74) *Attorney, Agent, or Firm* — Meenakshy Chakravorty

(57) ABSTRACT

The invention provides methods, devices (102, 110, 124, 136) and communication systems (100) for establishing end-to-end secure connections and for securely communicating data packets. Such a communication system (100) comprises a first device (124, 136), an intermediate device (110) and a second device (102). The first device (124, 136) communications via a first network (120), which is based on a first transport protocol and a first transport security protocol with the intermediate device (110). The second device (102) communications via a second network, which is based on a second transport protocol and a second transport security protocol with the intermediate device (110). The intermediate device (110) modifies packets received via first network to packets suitable for communication via the second network, and vice versa. The first device (124, 136) is able to reconstruct a header of a received packet as if the packet was sent via the second network (108) and its transport and security protocols. Further, the first device (124) is able to verify, on basis of the reconstructed header, verification fields which are generated on basis of the second transport security protocol.

14 Claims, 8 Drawing Sheets

| Application | HTTP | CoAP |
| --- | --- | --- |
| Transport | Handshake | Alert | Change Cipher Spec | Application Data |
| | Record Layer |
| | TCP | UDP |
| Network | IP |
FIG. 4a
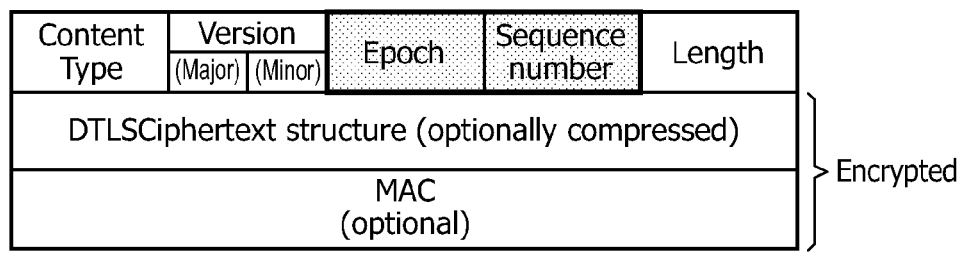
FIG. 4b
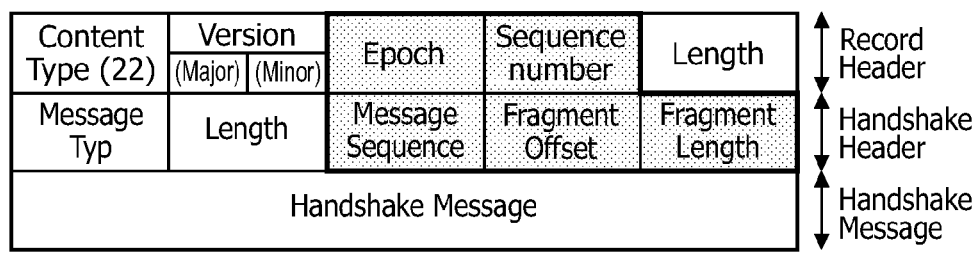
FIG. 4c

| Content Type (22) | Version (Major) (Minor) | Epoch | Sequence number | Length | | Record Header |
|---|---|---|---|---|---|---|
| Message Typ (1) | Length | Message Sequence | Fragment Offset | Fragment Length | | Handshake Header |
| Client Version | Random: gmt_unix_time, random_bytes | Session ID | Cookie | Cipher Suites Length | | ClientHello |
| Cipher Suite 1 | Cipher Suite n | Compression Method Length | Compression Method | Extension 1 (optional): Extension Type, Extension Data | | |
| Extension n (optional): Extension Type, Extension Data | | | | | | |

FIG. 5a

| Content Type (22) | Version (Major) (Minor) | Epoch | Sequence number | Length | Record Header |
|---|---|---|---|---|---|
| Message Typ (3) | Length | Message Sequence | Fragment Offset | Fragment Length | Handshake Header |
| Server Version | Cookie | | | | HelloVerify Request |

FIG. 5b

METHODS, DEVICES AND SYSTEMS FOR ESTABLISHING END-TO-END SECURE CONNECTIONS AND FOR SECURELY COMMUNICATING DATA PACKETS

FIELD OF THE INVENTION

The invention relates to methods, devices and systems for establishing end-to-end secure connections in situations where multiple security protocols are being used, such as, for example, the Transport Layer Security protocol (TLS) and the Datagram Transport Layer Security protocol (DTLS).

BACKGROUND OF THE INVENTION

The Internet of Things (IoT) denotes the interconnection of highly heterogeneous networked entities and networks following a number of communication patterns such as: human-to-human (H2H), human-to-thing (H2T), thing-to-thing (T2T), or thing-to-things (T2Ts). The term IoT was first coined by the Auto-ID center in 1999. Since then, the development of the underlying concepts has ever increased its pace. Nowadays, the IoT presents a strong focus of research with various initiatives working on the (re)design, application, and usage of standard Internet technology in the IoT.

The introduction of IPv6 and web services as fundamental building blocks for IoT applications promises to bring a number of basic advantages including: (i) a homogeneous protocol ecosystem that allows simple integration with Internet hosts; (ii) simplified development of very different appliances; (iii) an unified interface for applications, removing the need for application-level proxies. Such features greatly simplify the deployment of the envisioned scenarios ranging from building automation to production environments to personal area networks, in which very different things such as a temperature sensor, a luminaire, or an RFID tag might interact with each other, with a human carrying a smart phone, or with backend services.

In this setting, a number of IETF working groups are designing new protocols for resource constrained networks of smart things. The 6LoWPAN working group concentrates on the definition of methods and protocols for the efficient transmission and adaptation of IPv6 packets over IEEE 802.15.4 networks. The CoRE working group provides a framework for resource-oriented applications intended to run on constrained IP network (6LoWPAN). One of its main tasks is the definition of a lightweight version of the HTTP protocol, the Constrained Application Protocol (CoAP), that runs over UDP and enables efficient application-level communication for things.

These new protocols are going to enable many different applications including Building Automation Control (BAC), Health monitoring, Smart Energy, etc. In this setting, end devices (such as actuators or sensors) forming a 6LoWPAN/CoAP network will be used for real time monitoring or control of physical parameters and appliances. In the case of BAC, an actuator might be a luminaire and a sensor, a light sensor and the luminaire might access the resources of the light sensor adapting its light settings. Another scenario refers to that one in which a CoAP device (e.g., a client) located in the backend, i.e., outside the 6LoWPAN/CoAP network accesses the resources of a device (e.g., a CoAP server) in the 6LoWPAN/CoAP network over a 6LoWPAN Border Router (6LBR) that interconnects the Internet with the 6LoWPAN/CoAP network. Such an access can be required to obtain specific resources or to push some specific configuration from the backend to the CoAP device in the 6LoWPAN/CoAP network.

Security is a key aspect for the above application areas and use cases. A particular goal of security is the provision of basic security services such as confidentiality, authentication, or freshness between two devices. In the case of using symmetric-key cryptography, this pair of devices shares a common master key that is used during a common handshake for mutual authentication and derivation of a secret session key. This session key is used together with a cipher suite to provide the above security services in the exchange of information between the two devices. A similar handshake can also be performed by means of asymmetric-key cryptography.

In the case of IP protocols, there exist different security protocols including TLS or DTLS. TLS is used to protect protocols at application layer running on top of Transmission Control Protocol (TCP). DTLS is its extension used to protect applications running on UDP. CoAP identifies DTLS as the mandatory approach to protect the exchange of a CoAP communication, while most installed base servers use instead of CoAP, for example, the Hypertext Transfer Protocol (HTTP) which is used in combination with TCP and TLS.

The provision of a secure end-to-end connection is challenging in the above setting. One of the reasons is that the 6LoWPAN Border Router or Proxy (6LBR) should be able to verify whether the exchanged requests between two devices located outside and inside the 6LoWPAN/CoAP network. This happens when, e.g., a CoAP client of a utility company sends a request to a CoAP server (e.g., a smart meter). The 6LBR must be able to verify that requests coming from the client are valid in order to prevent (or limit the effect of), e.g., an energy exhausting attack. Another very interesting situation refers to the existence of legacy devices in the backend, e.g., HTTP devices that should be able to access the information in the end devices in the 6LoWPAN/CoAP network. In this situation, establishing a secure end-to-end connection between, e.g., an HTTP client in the backend and a CoAP server in the 6LoWPAN/CoAP network, remains a challenge due to the diverse key exchange mechanisms being used, i.e., TLS (TCP-based) in the legacy systems, while the constrained 6LOWPAN networks only supports DTLS (UDP-based). This is even more complex because the CoAP devices in the 6LoWPAN/CoAP network do not know where the key establishment requests are coming from.

For certain situations end-to-end connectivity is a must e.g. software updates, network admission, billing, etc. In such situations, an end-to-end handshake is required. On the internet, legacy systems only support HTTP over TCP, and TLS for secure connections. Therefore the specific situation discussed here can be depicted as follows: a HTTP device on the Internet uses HTTP to access resources from a CoAP device directly. The protocol conversion is done by a HTTP/CoAP proxy that is present between them. Goal in this situation is to ensure that the HTTP device can have a secure end-to-end communication using TLS, and the CoAP device can setup a secure end-to-end communication using DTLS.

TCP is a connection-oriented protocol offering a reliable communication. However, UDP is not connection-oriented and does not ensure packet delivery. As stated above, DTLS is an extension of TLS to run over UDP overcoming the limitations of UDP. In both cases, the initial handshake of TLS and DTLS comprises the exchange of 4 set of messages between the client and the server. Below we discuss the minimum handshake. Note that each step refers to the sending of a number of messages from a first device (e.g., client) to a second device (e.g., server).

Step 1 (from Client to Server): Client Hello

Step 2 (from Server to Client): Server Hello; ServerHelloDone

Step 3 (from Client to Server): ClientKeyExchange; ChangeCipherSpec; Finished

Step 4 (from Server to Client): ChangeCipherSpec, Finished

Although DTLS is based on TLS and the messages above remain the same, there are minor differences which make the protocols not interoperable with each other. Some of the differences are:

A cookie mechanism can be used in DTLS to verify the existence of a client initiating the requests. In TLS, such a cookie mechanism is not required because the TCP three-way handshake determines the existence of the client.

DTLS incorporates additional fields to provide the needed reliability for running DTLS over UDP. In TLS, the underlying TCP layer provides the needed reliability so that those fields are not required.

DTLS relies on a retransmission mechanism during the initial handshake to ensure that the messages sent by a first device are received by the second device. TLS does not require such an approach since reliable transmission is ensured by TCP.

SUMMARY OF THE INVENTION

Thus, it is an object of the invention to provide the logic required in a constrained devices being part of a constraint network to allow the constrained devices to establish a secure end-to-end connection with other devices which do not run a constrained application protocol. It is not preferred to modify the non-constrained devices to establish end-to-end secure connections, and it is not preferred to change the existing security protocols. Further, it is also not preferred to create a lot of overhead in constrained devices.

A first aspect of the invention provides two communication systems for securely communicating data packets between a first device and a second device. A second aspect of the invention provides two devices for use in the communication systems of the first aspect of the invention. A third aspect of the invention provides an intermediate device for use in the communication systems of the first aspect of the invention. A fourth aspect of the invention provides two methods of securely communicating data packets between a first device and a second device. Advantageous embodiments are defined in the dependent claims.

A communication system in accordance with the first aspect of the invention is for securely communicating data packets between a first device and a second device. The communication system comprises a first network, a first device, a second network, a second device and an intermediate device. The first network is based on a first transport protocol. The first device communicates via the first network with other devices and applies a first transport security protocol on top of the first transport protocol. The second network is based on a second transport protocol. The first transport protocol or the second transport protocol is a datagram based network protocol and the other one of the first transport protocol or the second transport protocol is a reliable connection oriented transport protocol. The second device communicates via the second network with other devices and the second device applies a second transport security protocol on top of the second transport protocol. The intermediate device communicates via the first network with the first device and communicates via the second network with the second device. The intermediate device modifies data packets received via the first network which are generated in accordance to the first transport security protocol towards data packets for communication via the second network in accordance with the second transport security protocol, and vice versa. Thus, data packets received via the second network are also modified towards packets suitable for communication via the first network. The first device reconstructs a header of a first data packet received from the intermediate device such that the header corresponds to a header of a second packet that was communicated by the second device to the intermediate device and was modified by the intermediate device to the first data packet. The first device verifies a security verification field of a received data packet on basis of the reconstructed header of the first data packet. The verification field is generated by the second device in accordance with the second transport security protocol. It is to be noted that the received data packet (of which the security verification field is verified) may be the first data packet of which the header is reconstructed, or is another data packets which is received later.

The solution of the invention is related to two measures taken in the system. The intermediate device changes data packets from a format used on the first network to a format used on the second network. Often, this only includes changes to headers of the packets, and may include changes related to information of the first transport security protocol and/or of the second transport security protocol. It is to be noted that the data packet payloads are, in most cases, not changed while the intermediate device changes data packets from the format used on the first network to a format used on the second network. Subsequently, the first device is able to reconstruct the original header as it was received by the intermediate device via the second network (thus, the header as received by the intermediate device before the header was changed to a format suitable for communication on the first network). Subsequently, the first device is able to verify verification fields of a received data packet on basis of the reconstructed header. The received verification field is generated by the second device on basis of the second transport security protocol. Often, the generation of verification fields includes the use of a (hashing) function which uses one or more data packet headers and/or data packet payloads as input. Thus, the headers, which were used to generate the verification field, must also be available at the verifying device for the verification of the verification field. The reconstruction of the header guarantees the availability of these headers.

In certain transport security protocols, the end-to-end connection can only be established when at least one of the devices is capable of verifying a verification field. Thus, the invention provides the possibility to establish secure end-to-end connection because differences in the first transport security protocol and in the second transport protocol are overcome. In certain transport security protocols, once a secure connection is established, verification fields are still used to verify the authenticity of the received data packets and the invention provides means to do so.

According to the first aspect of the invention, no changes are required in the second device. Further, although the intermediate device has to do some translations from the first transport security protocol to the second transport security protocol, the intermediate device is not actively involved in the establishment of the secure end-to-end connection and is not actively involved in the verification of information. This means that, in transport security protocol in which the end devices have a private, pre shared, key, the intermediate device does not have knowledge of this key because it is not actively involved in executing the transport security protocols.

It is to be noted that the verification of the security verification field is performed on the basis of the reconstructed header of the data packet. "Being based" on does not mean that it is limited to verification on basis of the reconstructed header of the data packet, the verification may take into account other data, like the payload of the data packet.

Optionally, the first transport security protocol and the second transport security protocol initiate a secure communication session with a handshake protocol. The received data packet, comprising the verification field, is a data packet of the handshake protocol. Thus, the handshake protocol prescribes the exchange of data packets which comprise a verification field. The invention allows the verification of the verification field, and, thus, the execution of the handshake protocol. Often, like in Transport Layer Security (TLS) or Datagram Transport Layer Security (DTLS), a finished message must be sent at the end of the handshake and the handshake comprises a verification code which is also based on packet headers and payloads sent during the handshake. In such cases, according to the invention, the packets headers can be reconstructed at the first device and the finished message can be verified as required by the protocol used by the second device.

Optionally, the received packet comprises a message authenticating code as a security verification field for authenticating the authenticity of the received data packet. In several transport security protocol the use of Message Authenticating Codes is mandatory for messages communicated on an established end-to-end secure connection in order to be able to verify the authenticity of the message. The Message Authenticating Code is often based on the header and the payload of the data packet at the moment of transmission of the data packet. If, as in the system of the invention, the data packet is modified by the intermediate device for transmission along another network with another transport security protocol, the content of the header of the data packet may be changed, and, thus, must be reconstructed in order to verify the Message Authenticating Code.

Optionally, the first device first verifies the security verification code in accordance with the first transport security protocol and if this verification is unsuccessful, the header of the first data packet is reconstructed and the security verification field is verified on basis of the reconstructed header of the first data packet in accordance with the second transport security protocol. Thus, the first device is configured to apply a trial and error approach. The first device expects a verification code on basis of the first transport security protocol and, thus, first tries to verify the verification code accordingly. If this is successful the verification code was apparently received from a device which uses the first transport security protocol as well. If this is unsuccessful, the header is reconstructed and if the verification according to the second transport security protocol is successful after reconstruction of the header, the data packet was originally sent by a device which uses the second transport security protocol. Thus, initially the first device does not need to have knowledge about the other device. The first device is capable of finding out which transport security protocol is used. After verification according to this optional embodiment, the first device has also knowledge that data packets received from a particular device are sent according to a particular transport security protocol. This knowledge can be used in future attempts to verify the verification code such that unnecessary "trial and error" steps are prevented.

According to the first aspect of the invention, a further communication system for securely communicating data packets between a first device and a second device is provided. The communication system comprises a first network, a first device, a second network, a second device and an intermediate device. The first network is based on a first transport protocol. The first device communicates via the first network with other devices and applies a first transport security protocol on top of the first transport protocol. The second network is based on a second transport protocol. The first transport protocol or the second transport protocol is a datagram based network protocol and the other one of the first transport protocol or the second transport protocol is a reliable connection oriented transport protocol. The second device communicates via the second network with other devices and the second device applies a second transport security protocol on top of the second transport protocol. The intermediate device communicates via the first network with the first device and communicates via the second network with the second device. The intermediate device modifies data packets received via the first network which are generated in accordance to the first transport security protocol towards data packets for communication via the second network in accordance with the second transport security protocol, and vice versa. Thus, data packets received via the second network are also modified towards packets suitable for communication via the first network. The first device reconstructs a header of a first data packet received from the intermediate device such that the header corresponds to a header of a second packet that was communicated by the second device to the intermediate device and was modified by the intermediate device to the first data packet. The first device generates a security verification field for a third data packet to be sent. The security verification field being generated on basis of the reconstructed header of the first data packet and is generated in accordance with the second transport security protocol.

This further communication system in accordance with the first aspect of the invention is strongly related to the earlier discussed communication system. The earlier discussed communication system defines that the first device is capable of verifying a verification field that is being generated in accordance with the second aspect of the invention, the further communication system defines that the first device is capable of generating a verification field in accordance with the second aspect of the invention. Thus, in one of the systems according to the first aspect of the invention the first device is the client and the second device is the server, in the other one of the systems the roles are reversed. Thus, in other words, if both aspects of the invention are combined in a single system, the first device is fully capable of securely communicating with the second device which applies the second transport security protocol in all possible (client/server) roles of the first device.

Optionally, the first transport security protocol and the second transport security protocol initiate a secure communication session with a handshake protocol. The third data packet to be sent is a data packet of the handshake protocol. As discussed at another optional embodiment, the handshake protocol often comprises finished message which comprise a verification code which is based on one or more headers and payloads of data packets. This optional embodiment provides the first device with the capability to generate such finished messages with a verification code in accordance with the second transport security protocol. And, thus, the second device is capable to verify such finished messages without having knowledge about the first transport security protocol.

Optionally, the first device sends a fourth data packet comprising a security verification field generated in accordance with the first transport security protocol and sends the third data packet comprising the security field generated in accordance with the second transport security protocol. Thus, the first device applies a "trial and error approach" by sending two different data packets in which one data packets comprises the verification code in accordance with the first transport security protocol and the other data packet comprises the verification code in accordance with the second transport security protocol. In an optional, practical, embodiment, the fourth packets with the verification code in accordance with the first transport security protocol is sent first, and if no positive continuation of the secure communication is detected, the third packets with the verification code in accordance with the second transport security protocol is subsequently sent. The non-positive continuation of the secure communication means that the other device was most probably not able to understand the verification field of the first transport security protocol and, thus, is most probably able to understand the verification field of the second transport security protocol.

Optionally, the first device detects whether it communicates with another device which applies the second transport security protocol. The first device is configured to send the third data packet comprising the security field generated in accordance with the second transport security protocol if the first device detected that it communicates with another device applying the second transport security protocol. The knowledge about the another device allows the first device to immediately send a data packet which comprises a verification code in accordance with transport security protocol that is understood by the another device. This increases efficiency. The detection of the whether the another device applies the first transport security protocol or the second transport security protocol may be based on trial and error transmission and/or verification of generated or received verification fields, such as described before in two optional embodiments.

Optionally, the first network transport communication protocol is the Internet Protocol based User Datagram Protocol, the second network transport communication protocol is the Internet Protocol based Transport Control Protocol, the first transport security protocol is the Datagram Transport Layer Security Protocol, and the second transport security protocol is the Transport Layer Security Protocol. Especially the combination of the Datagram Transport Layer Security (DTLS) Protocol in the first network and the use of Transport Layer Security (TLS) Protocol in the second network is advantageous because the headers of data packets which are sent in accordance with DTLS comprise a few additional fields compared to data packets which are sent in accordance with TLS. Thus, the intermediate device must only generate the additional fields if a packet is received from the second network, and the intermediate device must only delete the additional fields if a packet received from the first network. Especially the generation of additional fields is an operation which can easily reversed by the first device, and, thus, is the reconstruction of the header by the first device a relative simple operation which does not require much knowledge about the second network, the second network transport protocol, the second transport security protocol or the second device.

Optionally, the first device is configured to apply the Constrained Application Protocol and the second device is configured to apply the Hypertext Transfer Protocol.

According to a third aspect of the invention, a first device is provided for use in a communication system according to the first aspect of the invention. The first device comprises a first network interface, a first security protocol application means, a reconstructor and a verificator. The first network interface communicates via a first network with other devices. The first network is based on a first transport protocol which is a datagram based network protocol or a reliable connection oriented transport protocol. The first security protocol application means applies a first transport security protocol on top of the first transport protocol. The reconstructor reconstructs a header of a received first data packet such that the header corresponds to a header of a second data packet that was received by an intermediate device via a second network being based on a second transport protocol on top of which a second transport security protocol is being used. The first data packet is received from the intermediate device via the first network. The verificator verifies a security verification field of a received data packet on basis of the reconstructed header of the first data packet. The verification field is generated in accordance with the second transport security protocol.

According to a third aspect of the invention, a further first device is provided for use in a communication system according to the first aspect of the invention. The first device comprises a first network interface, a first security protocol application means, a reconstructor and a generator. The first network interface communicates via a first network with other devices. The first network is based on a first transport protocol which is a datagram based network protocol or a reliable connection oriented transport protocol. The first security protocol application means applies a first transport security protocol on top of the first transport protocol. The reconstructor reconstructs a header of a received first data packet such that the header corresponds to a header of a second data packet that was received by an intermediate device via a second network being based on a second transport protocol on top of which a second transport security protocol is being used. The first data packet is received from the intermediate device via the first network. The generator is configured to generate a security verification field for a third data packet to be sent. The security verification field is generated on basis of the reconstructed header of the first data packet and is generated in accordance with the second transport security protocol.

The first device according to the second aspect of the invention provides the same benefits as the system according to the first aspect of the invention and has similar embodiments with similar effects as the corresponding embodiments of the system.

According to the third aspect of the invention, an intermediate device is provided for application in one of the communication systems according to the second aspect of the invention. The intermediate device comprises a first network interface, a second network interface, a first security application means, a second security application means, and a modificator. The first network interface communicates via a first network with a first device. The first network is based on a first transport protocol. The second network interface communicates via a second network with a second device. The second network is based on a second transport protocol. The first or the second network protocol is a datagram based network protocol and the other one of the first or the second network protocol is a reliable connection oriented transport protocol. The first security application means applies a first transport security protocol on top of the first transport protocol. A second security application means applies a second transport security protocol on top of the second transport protocol. The modificator modifies data packets received via the first network and which are generated in accordance to the first transport security protocol towards data packets for communication via the second network in accordance with the second transport security protocol, and vice versa.

The intermediate device according to the third aspect of the invention provides the same benefits as the system according to the first aspect of the invention and has similar embodiments with similar effects as the corresponding embodiments of the system.

According to a fourth aspect of the invention, a method of securely communicating data packets between a first device and a second device is provided. The method comprises the steps of: i) receiving a first data packet via a first network being based on a first transport protocol, a first transport security protocol being applied on top of the first transport protocol, ii) modifying the first data packet to a second data packet to be sent via a second network being based on a second transport protocol, a second transport security protocol being applied on top of the second transport protocol, the first transport protocol or the second transport protocol is a datagram based network protocol and the other one of the first transport protocol or the second transport protocol is a reliable connection oriented transport protocol, iii) sending the second data packet via the second network, iv) receiving the second data packet, v) reconstructing a header of the second data packet received from the intermediate device such that the header corresponds to a header of the first packet, vi) verify a security verification field of a received data packet on basis of the reconstructed header of the first data packet, the verification field being generated in accordance with the first transport security protocol. It is to be noted that the received data packet which comprises the verification field may be the received second data packet or is another data packet which is received later than the second data packet.

According to the fourth aspect of the invention, a further method of securely communicating data packets between a first device and a second device is provided. The method comprises the steps of: i) receiving a first data packet via a first network being based on a first transport protocol, a first transport security protocol being applied on top of the first transport protocol, ii) modifying the first data packet to a second data packet to be sent via a second network being based on a second transport protocol, a second transport security protocol being applied on top of the second transport protocol, the first transport protocol or the second transport protocol is a datagram based network protocol and the other one of the first transport protocol or the second transport protocol is a reliable connection oriented transport protocol, iii) sending the second data packet via the second network, iv) receiving the second data packet, v) reconstructing a header of the second data packet received from the intermediate device such that the header corresponds to a header of the first packet, vi) generating a security verification field for a third data packet, the security verification field being generated on basis of the reconstructed header of the first data packet and being generated in accordance with the first transport security protocol, and vii) sending the third data packet via the second network.

The method according to the fourth aspect of the invention provides the same benefits as the system according to the first aspect of the invention and has similar embodiments with similar effects as the corresponding embodiments of the system.

These and other aspects of the invention are apparent from and will be elucidated with reference to the embodiments described hereinafter.

It will be appreciated by those skilled in the art that two or more of the above-mentioned options, implementations, and/or aspects of the invention may be combined in any way deemed useful.

Modifications and variations of the system, the method, and/or of the computer program product, which correspond to the described modifications and variations of the system, can be carried out by a person skilled in the art on the basis of the present description.

Figure 1:
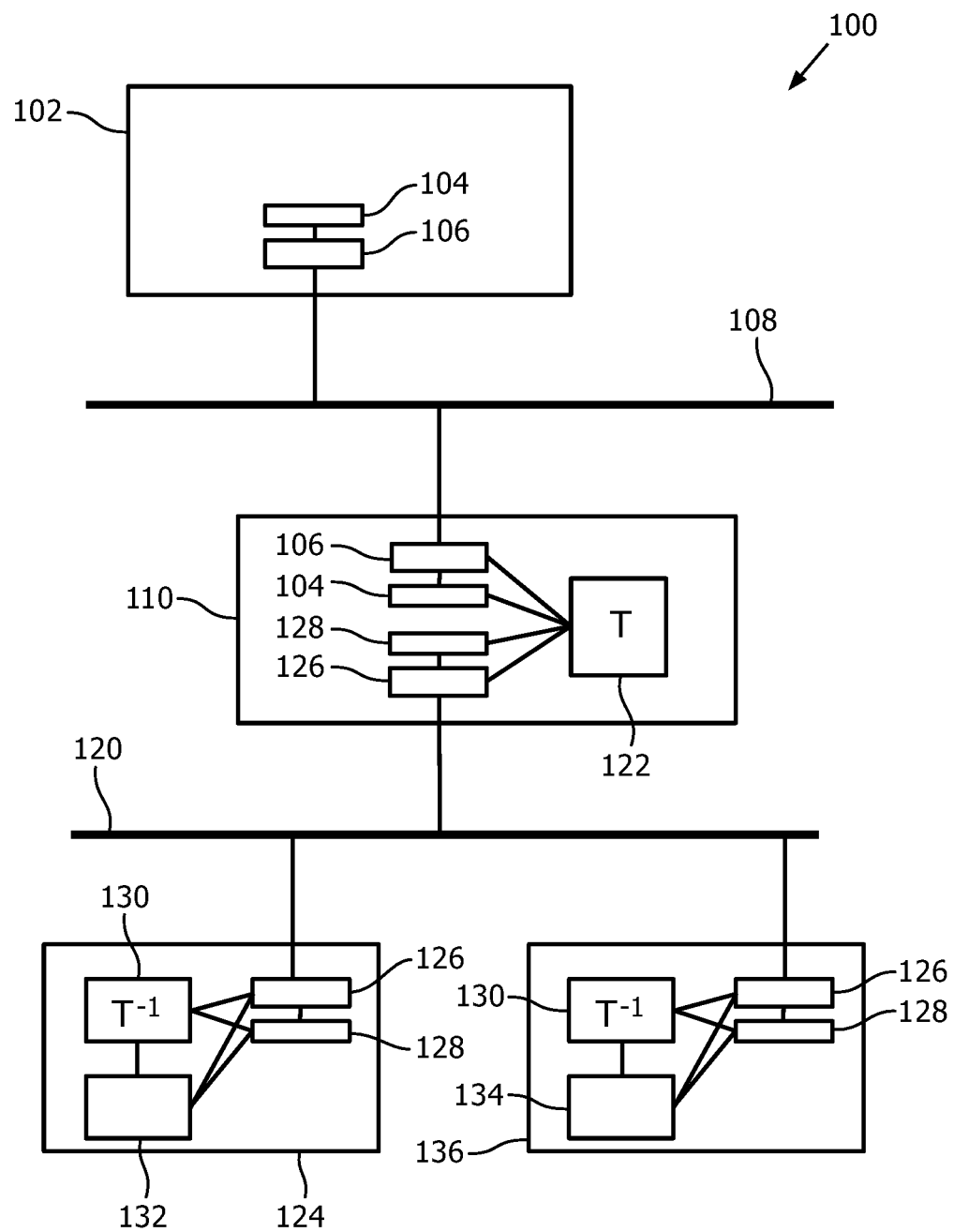
FIG. 1 schematically shows a system according to the first aspect of the invention,
FIG. 2a and FIG. 2b schematically show secure end-to-end communication architectures across the internet to a 6LowPAN network, each comprising an embodiment of the invention,
FIG. 3a schematically shows a sequence diagram of TLS Handshake protocol with PSK,
FIG. 3b schematically shows a sequence diagram of DTLD handshake protocol with PSK,
FIG. 4a schematically shows the TLS and DTLS in the OSI model,
FIG. 4b schematically shows the structure of TLS/DTLS packets with highlighted DTLS specific fields,
FIG. 4c schematically shows the structure of TLS/DTLS handshake messages with highlighted DTLS specific fields,
FIG. 5a schematically shows the structure of TLS/DTLS ClientHello messages with highlighted DTLS specific fields,
FIG. 5b schematically shows the structure of DTLS HelloVerifyRequest messages.

It should be noted that items denoted by the same reference numerals in different Figures have the same structural features and the same functions, or are the same signals. Where the function and/or structure of such an item have been explained, there is no necessity for repeated explanation thereof in the detailed description.

The Figures are purely diagrammatic and not drawn to scale. Particularly for clarity, some dimensions are exaggerated strongly.

DETAILED DESCRIPTION OF THE EMBODIMENTS

A first embodiment of the system 100 according to the first aspect of the invention is schematically shown in FIG. 1. The system 100 comprises a first network 120 which uses a first transport protocol. A first transport security protocol may be used on top of the first transport protocol. The system 100 further comprises a second network 108 which uses a second transport protocol. A second transport security protocol may be used on top of the second transport protocol. A first device 124 or a further first device 136 is coupled to the first network 120. An intermediate device 110 is coupled in between the first network 120 and the second network 108. A second device 102 is coupled to the second network 108.

The second device 102 has a second network interface 106 which is directly coupled to the second network 108 and which applies the second transport protocol. The second network interface 106 is coupled to the second security protocol application means 104 which applies the second transport security protocol to data transferred from the second device 102 to the second network 108 and data which is received from the second network 108 by the second device 102.

The intermediate device 110 also comprises a second network interface 106 which provides a connection between the intermediate device 110 and the second network 108. The second security protocol application means 104 is used by the intermediate device 110 to handle the second transport security protocol for the communication via the second network. The intermediate device 110 is further coupled to the first network 120 with a first network interface 126 and the intermediate device further comprises a first security protocol application means 128 for applying a first transport security protocol on top of the first transport protocol of the first network 120. One of the important functions of the intermediate device 110 is executed the modificator 122 which modifies data packets received via the first network and which are generated in accordance to the first transport security protocol towards data packets for communication via the second network in accordance with the second transport security protocol, and vice versa. The modificator 122 performs the translation of the first transport protocol to the second transport protocol and vice versa, and performs the translation of the first transport security protocol to the second transport security protocol and vice versa. As the result of the modification the headers of the data packets are changed and, often, depending on the specific protocol used, the payload is often not touched.

In an embodiment, the modificator 122 is not actively involved in the first transport security protocol and/or the second transport security protocol. This means that the modificator 122 has no knowledge of secret keys which are used in the respective transport security protocol and does not establish end-to-end connections. The modificator 122 only changes the headers of the data packets such that they can be correctly transported by the separate networks. Further, relatively simply modifications to the packet header which directly relate to the combination of the transport protocol and the transport security protocol may be performed as well by the modificator 122. For example, the Datagram Transport Layer Security (DTLS) protocol adds a limited number of fields to a packet header of a data packet which were originally generated by the Transport Layer Security protocol. The additional fields provide functionality such that the Transport Layer Security (TLS) can be used on top of User Datagram Protocol (UDP) as transport protocol. In the example, the modificator 122 adds such fields without having knowledge about the secure information of the respective transport security protocols.

In FIG. 1 two different embodiments of the first device 124, 136 are presented.

A first embodiment of the first device 124 comprises a first network interface 126 which connects the first device 124 to the first network 120. The first device 124 also has a first transport security protocol application means 128 which is capable of applying the first transport security protocol to the communication via the first network 120. The first device 124 also comprises a reconstructor 130 which reconstructs a header of data packet received via the first network 120 towards a header of a data packets as if it was transmitted via the second network 108 and as if the second transport security protocol was applied to the communication. Thus, in other words, the reconstructor 130 is capable of reversing the operation of the modificator 122 of the intermediate device 110. The first device 124 further comprises a verificator 132 which is capable of verifying verifications fields in received data packets on basis of the reconstructed header(s). The verification fields received in data packets may originate from the second device 102 which generates the data packets on basis of the second transport security protocol and, thus, are the verification fields also generated on basis of the second transport security protocol. Most transport security protocols generate verification fields on basis of one or more headers of data packets sent in accordance with the specific transport security protocol. Thus, in order to be able to verify such verification fields, the one or more headers must be reconstructed first, which is done by the reconstructor 130. Depending on the specific verification field, if the verificator 132 is able to verify the verification field to establish a secure end-to-end connection, or the authenticity of a received data packet can be confirmed.

A second embodiment of the first device 136 is similar to the first embodiment of the first device 124, only first device 136 of the second embodiment does not have the verificator 132 but has a generator 134 for generating a security verification field for a data packet to be sent. The security verification field is generated on basis of the reconstructed header of the first data packet and being generated in accordance with the second transport security protocol. Thus, the first device 136 is able to send data packets to the second device 102 which is able to verify such verification fields. Thus, if the second device 102 is able to positively verify such verification fields, a secure end-to-end connection can be established, or the authenticity of a transmitted data packet may be confirmed by the second device.

It is to be noted that the first embodiment of the first device 124 and the second embodiment of the first device 136 may also be combined in a single device which comprises the verificator 132 and the generator 134.

Figure 2A:
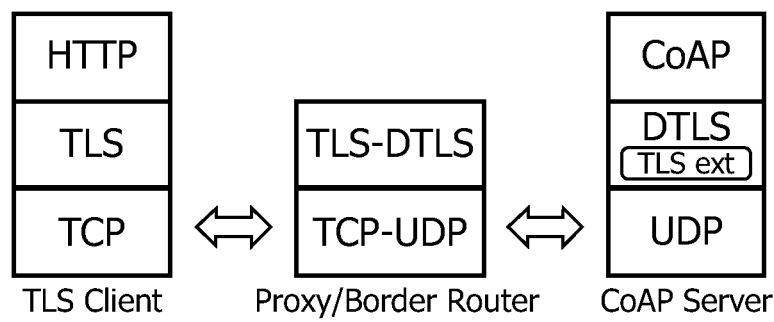

FIG. 2a illustrates an architecture to facilitate communication across the Internet to the constrained IP network (e.g. 6LOWPAN) network. The aim is to enable a legacy system (Transport Layer Security (TLS) Client) which is connected to the Internet to establish a secure End-to-End (D)TLS handshake with a Constrained Application Protocol (CoAP) Server, while the proxy/border router does not learn the secret of the handshake.

When executing the (D)TLS handshake between the TLS client and the CoAP Server, the proxy/border router (the intermediate device) is responsible for translating TLS packets and then repackaging them into the corresponding DTLS packets and vice versa.

At the end of the handshake, the CoAP Server is able to distinguish whether the communicating client is running TLS or DTLS, and it can then generate the corresponding "Finished Message" to complete the handshake. This ensures that the existing legacy clients can establish a secure E2E handshake with CoAP Server without needing any modification to the client logic.

The handshake also exploits the cross-layer optimization between the DTLS and TCP in that the existence of a valid TLS client can be determined by the proxy/border router using TCP Sync Random, while keeping the DTLS cookie mechanism local to the 6LOWPAN network.

Since the CoAP Server does not know whether it is interacting with a HTTP Client or a CoAP Client, and that it is important to keep the legacy system (i.e., HTTP Client) unchanged, an extra logic is needed in the 'TLS ext' in the CoAP device to ensure that the (D)TLS handshake protocol can be successfully completed with the TLS Client.

Differences Between TLS and DTLS During Handshake

Figure 3A:
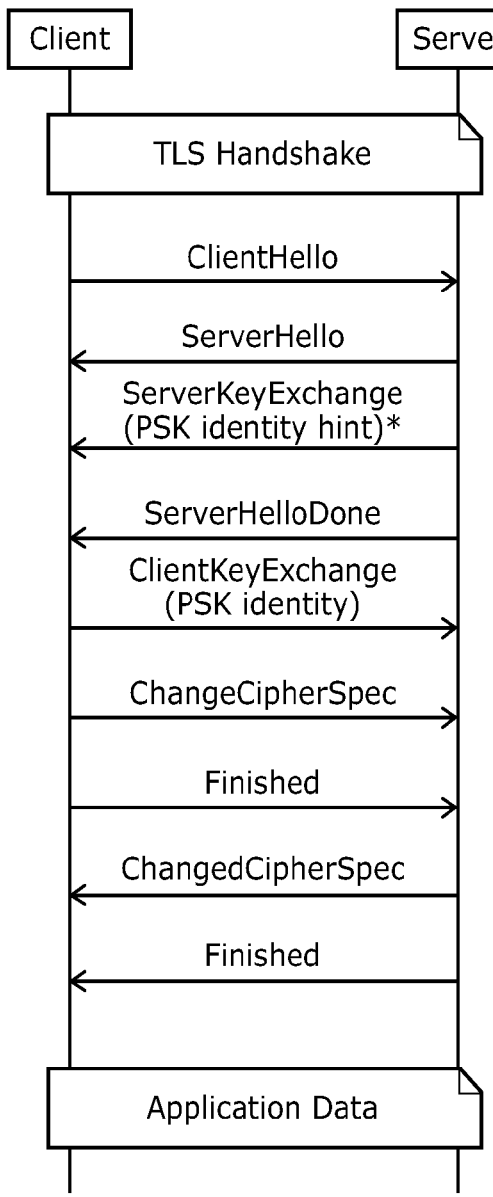
Figure 3B:
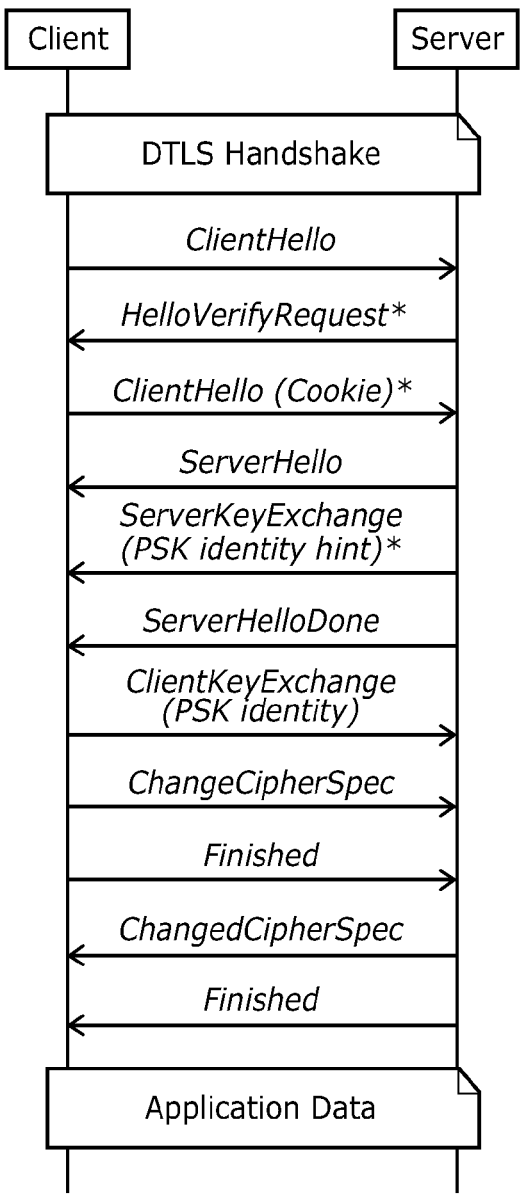

Before two peers are able to exchange messages in a secure way by means of (D)TLS and a pre-shared key, they have to negotiate several security parameters, like CipherSuites, compression methods or key identities. This is done by the (D)TLS handshake, also containing the authentication of the communicating entities. FIG. 3a and FIG. 3b illustrate the sequence diagrams of the TLS and DTLS Handshake with a pre-shared key (PSK) respectively. Messages marked with * are optional.

When using TLS, the HTTP client sends first a ClientHello message with its available CipherSuites and nonce, used for creating a session key. The CoAP server picks one of the provided CipherSuites and sends it in a ServerHello message back to the client. Now it is up to the server to provide a "PSK identity hint" in a ServerKeyExchange, which helps the client to choose an appropriate key. In case of no hint can be provided, this message is omitted. To indicate the end of the hello-message phase, the server sends the ServerHelloDone message. Now the HTTP client indicates with or without a hint from server which key is used by sending the ClientKeyExchange message. After sending the ChangeCipherSpec message, the handshake will be authenticated with the Finished message. The TLS Finished message is computed using a pseudorandom function (PRF) taking the input of the master secret, the finished label ("client finished") and the hash of the concatenation of all messages of type handshake exchanged up to this point, except the Finished message itself. Upon successful authentication and key agreement, information can be transmitted over a secure connection.

As in TLS, in DTLS the client starts with a ClientHello message. As mentioned above, a cookie mechanism can be used for verifying the existence of the client. Initially, this field is set to empty. Now, it is up to the server to decide, whether a cookie will be used or not. If not, it sends the ServerHello message, otherwise the HelloVerifyRequest message including a cookie is sent to the client. In the latter case, the client sends again the ClientHello message with the same parameters, but including the cookie, given from the server. After that, the messages are exchanged in the same way and in the same order like in TLS.

Structure of TLS and DTLS Packets

As illustrated in FIG. 4a (D)TLS is layered between application layer and transport layer. It shows as well, that (D)TLS is a layered protocol. On the lower layer the Record Protocol is located, whereas on the upper layer four protocols are defined, namely the Handshake Protocol, the Alert Protocol, the ChangeCipherSpec Protocol and the Application Data Protocol. Each of these protocols provides its own message, which has to be sent in a defined point in time and way.

The general design for the Record messages is shown in FIG. 4b. Since before the completion of the Handshake no security parameters are established, these messages are not encrypted or do not include a MAC, shown in FIG. 4c. The differences between TLS and DTLS are highlighted. That means for the Record messages, DTLS adds two more fields in the header, in particular an epoch and a sequence number.

For the Handshake message header, a message sequence number and a fragment offset plus a fragment length are added.

The ClientHello message, illustrated in FIG. 5a, adds a field for the cookie and the HelloVerifyRequest does not exist in TLS (FIG. 5b).

Figure 6:
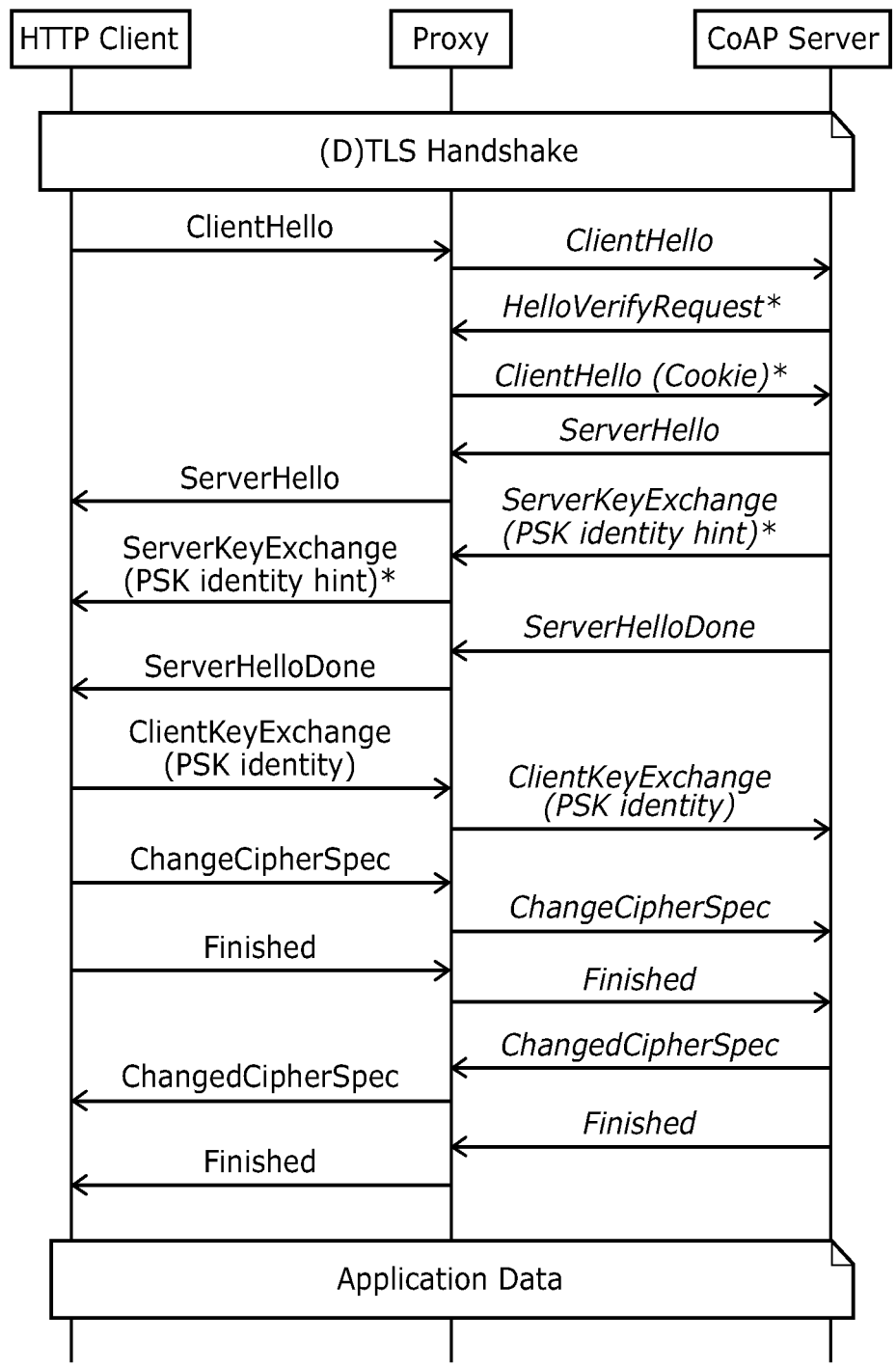
FIG. 6 schematically shows a combined TLS/DTLS Handschake protocol,
FIG. 7 schematically shows a flowchart for a CoAP server for receiving and verifying Finished Messages and then generating and sending an appropriate Finished message to the client,
FIG. 8a schematically shows a flowchart of a first method of the invention, and
FIG. 8b schematically shows a flowchart of a second method of the invention.

In FIG. 6, the combined TLS-DTLS Handshake is depicted. The proxy is responsible for translating TLS packets to DTLS packets and vice versa by means of adding or removing the fields, which are only related to DTLS. In case the server wants to use cookies and sends a HelloVerifyRequest message, the proxy must not forward the message to the HTTP client, because this message type is not used in TLS. Instead, the proxy answers the CoAP server with a second ClientHello message with the cookie given from the server. If the Finished message arrives, the proxy has to forward the message to the server. Since it does not possess the secret shared between client and server, it cannot change and verify the data in this message. Another task of the proxy refers to the capability of DTLS to retransmit missing message. Since this is the duty of a DTLS client, the proxy has to provide reliable transmission as well.

Exchanging and Computing the Content of the Finished Message for the Different Protocols As mentioned in the previous section, when completing the handshake protocol, the Finished message is sent to authenticate the handshake. The Finished message essentially contains only one field, namely Verify Data that is computed as follows: PRF(master_secret, finished label Hash(handshake_messages))[0 . . . verify_data_length−1] where the finished label is "client finished" for the client, and "server finished" for the server. The parameter handshake_messages is a concatenation of all prior exchanged messages.

The first Finished message is sent by the HTTP client to the HTTP/CoAP proxy. As described in the previous section, the proxy is responsible for translating the Finished message in TLS format to DTLS format by adding the Epoch and Sequence number in the Record Header. However, the proxy cannot recompute the Verify_Data as it does not have the master_secret, which is the secret shared between the client and server, negotiated during the handshake phase. The Finished message is then sent to the CoAP server by the proxy.

The CoAP server verifies the Client Finished Message by using the same PRF function. As the Client Finished message is of type DTLS handshake message (known from the Record Header and Handshake header in the message), the CoAP server computes the Verify_Data field based on all previous DTLS handshake messages (not including the Finished Message itself), and verifies it against the Client Finished message. If verification is successful, the CoAP Server sends a DTLS version of Server Finished Message to the proxy. Otherwise, if verification is not successful, the CoAP server shall not trigger the (fatal) Error Alert or terminate the exchange, but instead shall assume that the client is a HTTP Client (TLS), and hence it must re-compute the Verify_Data field again. However, this time, it removes the additional DTLS fields in all previous handshake messages (i.e., replace the DTLS handshake header with TLS handshake header and remove the cookie field in the ClientHello Message). If this verifies the Client Finished Message, it confirms that the Client is a HTTP Client (TLS). Subsequently, it prepares the corresponding Server Finished message such that it can be verified by the HTTP client (TLS), thus completing the handshake protocol to establish a secure end-to-end tunnel between the HTTP Client and CoAP Server.

Figure 7:
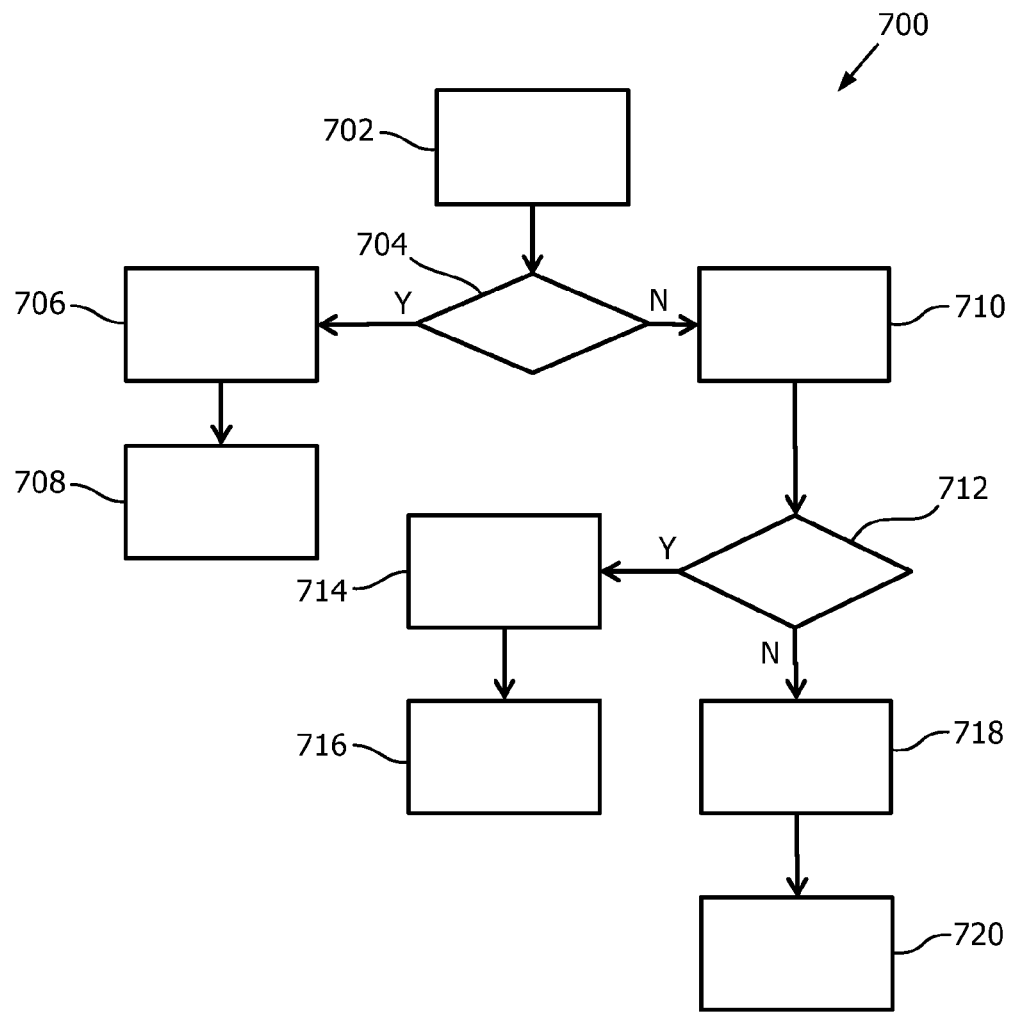

Thus, by first attempting to verify the client-sent "Finished" message as a DTLS message, and then when this verification fails, attempting to verify the "Finished" message as a TLS message, the CoAP server is able to distinguish between a CoAP/DTLS client and a HTTP/TLS client, and to generate an appropriate server "Finished" message for both cases. This is also shown in FIG. 7. If a "Finished" message is received 702, the "Finished" message is verified 704 on basis of DTLS protocol. If the result of the verification is positive, thus, if the message is verified, a "ChangeCipherSpec" message is sent 706 in accordance with the DTLS protocol and the handshake is finished by sending 708 a DTLS "Finished" message. If the verification 704 was not positive, the DTLS content is removed 710 from the header of the receive message and, if necessary, of headers of previous messages as well. Subsequently, the "Finished" message is verified 712 on basis of the TLS protocol. If the verification 712 is positive, thus, the verification field of the "finished" message could be verified on basis of the modified headers, a "ChangeCipherSpec" message is sent 714 followed by sending 716 a TLS "Finished" message. If the verification 712 was not positive, an error is alerted 718 and the connection is closed 720.

Secure End-to-End Communication Between a TLS Server and a CoAP Client

Figure 2B:
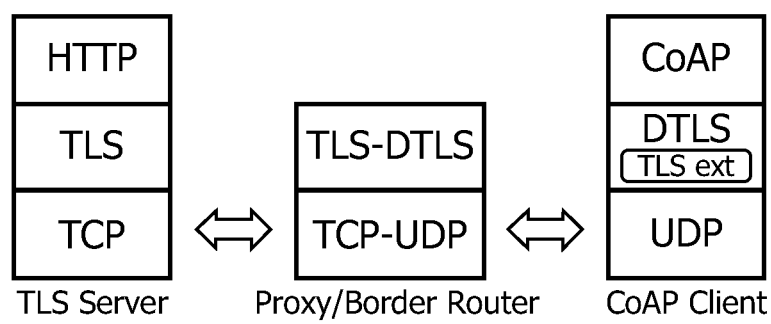

In a different scenario, and shown in FIG. 2b, in some applications it is possible that the constraint devices act as a client interacting with a server in the backend over the Internet via a HTTP/CoAP proxy. In this setup, the client typically polls, e.g. using a GET function, the Server for events, information, and data. In this scenario the aim is to enable the CoAP client to execute an end-to-end secure handshake with a legacy server, while the proxy/border router does not learn the secret of the handshake In this context, the (D)TLS handshake is still initiated by the CoAP client by sending the ClientHello Message to the TLS Server via the Proxy/Border Router which is responsible for translating DTLS packets to TLS packets and vice versa. The (D)TLS Handshake Protocol remains the same as described previously except that the roles of the two endpoint devices have been reversed. The role of the proxy remains unchanged: it adds/removes the DTLS-specific fields when forwarding the messages to/from the DTLS client, respectively.

However, since the CoAP Client does not know whether it is interacting with a HTTP Server or a CoAP Server, and that it is important to keep the legacy system (i.e., HTTP Server) unchanged, an extra logic is needed in the 'TLS ext' in the CoAP device to ensure that the (D)TLS handshake protocol can be successfully completed with the TLS Server.

In particular, the CoAP Client must send the first Finished message to the TLS Server via the proxy according to the (D)TLS Handshake protocol, however if the Finished message contains the Verify_Data calculated according to the DTLS protocol, then it cannot be verified by the TLS Server. The following outlines the possible solutions:

1. The CoAP client generates two "Finished" messages, the first message being a TLS "Finished" message and the second message being a DTLS "Finished" message, and sends these two messages to the proxy. The proxy then decides on the appropriate "Finished" message to be forwarded to the TLS server.

2. The CoAP client generates a DTLS "Finished" message first and sends it to the TLS server via the proxy. Clearly, the TLS server will not be able to verify the DTLS "Finished" message and sends a decrypt_error message to the CoAP client (via the proxy). As this message indicates a fatal error, the handshake will be terminated. The CoAP client then learns that the entity it is communicating with is a legacy TLS server, and re-initiates the DTLS/TLS handshake protocol, ensuring that it now generates the correct TLS "Finished" message for the TLS server. Additionally, the DTLS client can store the information about the server DTLS/TLS capabilities, and subsequently use the correct "Finished" message as the first message, which then shortens the exchange.

3. The CoAP client generates a TLS "Finished" message first and sends it to the TLS server via the proxy. If verification of the "Finished" message is successful, a secure end-to-end tunnel is established between the TLS server and the CoAP client. Otherwise, if the end point is a CoAP Server (DTLS) instead of HTTP Server (TLS), the verification of the "Finished" message would fail. However, even though the verification of "Finished" message has failed, there would be no fatal error reported in DTLS. Hence, the CoAP client can subsequently generate the correct DTLS "Finished" message for the CoAP Server (DTLS) to complete the handshake. This has the advantage that the CoAP Client does not need to re-initiate the DTLS/TLS handshake.

Figure 8A:
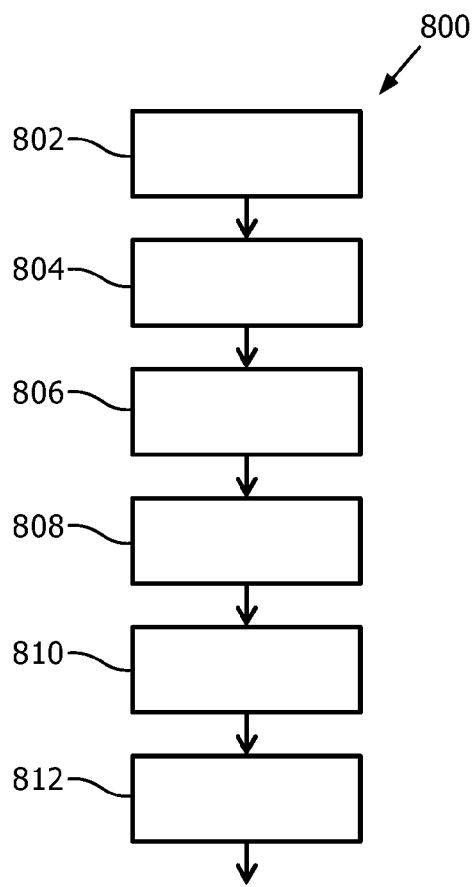

FIG. 8a shows a method 800 according to a fourth aspect of the invention. The method 800 is for securely communicating data packets between a first device and a second device. The method 800 comprises the steps of i) receiving 802 a first data packet via a first network being based on a first transport protocol, a first transport security protocol being applied on top of the first transport protocol; ii) modifying 804 the first data packet to a second data packet to be sent via a second network being based on a second transport protocol, a second transport security protocol being applied on top of the second transport protocol, the first transport protocol or the second transport protocol is a datagram based network protocol and the other one of the first transport protocol or the second transport protocol is a reliable connection oriented transport protocol; iii) sending 806 the second data packet via the second network; iv) receiving 808 the second data packet; v) reconstructing 810 a header of the second data packet received from the intermediate device such that the header corresponds to a header of the first packet; vi) verify 812 a security verification field of the second data packet or of the third data packet on basis of the reconstructed header of the first data packet, the verification field being generated in accordance with the first transport security protocol.

Figure 8B:
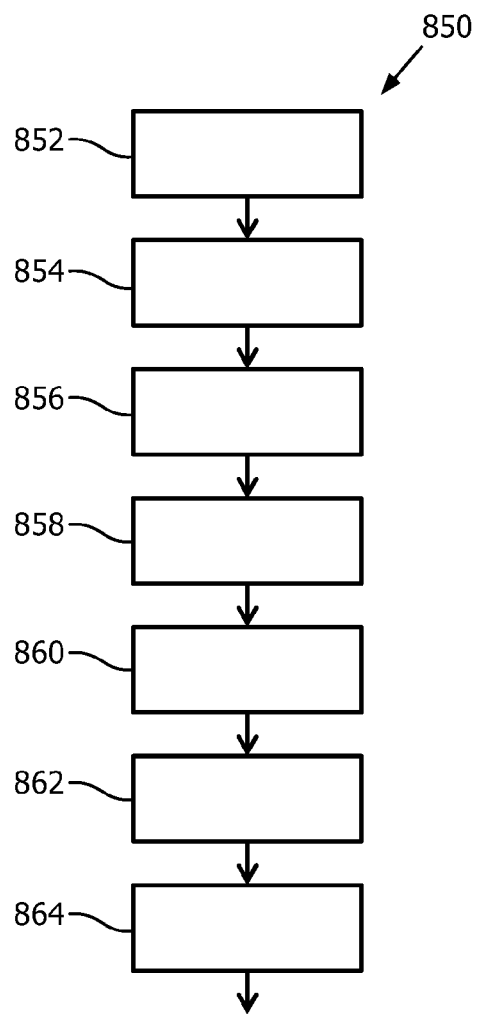

FIG. 8b shows a further method 850 according to a fourth aspect of the invention. The method 850 is for securely communicating data packets between a first device and a second device. The method 850 comprises the steps of i) receiving 852 a first data packet via a first network being based on a first transport protocol, a first transport security protocol being applied on top of the first transport protocol; ii) modifying 854 the first data packet to a second data packet to be sent via a second network being based on a second transport protocol, a second transport security protocol being applied on top of the second transport protocol, the first transport protocol or the second transport protocol is a datagram based network protocol and the other one of the first transport protocol or the second transport protocol is a reliable connection oriented transport protocol; iii) sending 856 the second data packet via the second network; iv) receiving 858 the second data packet; v) reconstructing 860 a header of the second data packet received from the intermediate device such that the header corresponds to a header of the first packet; vi) generating 862 a security verification field for a third data packet, the security verification field being generated on basis of the reconstructed header of the first data packet and being generated in accordance with the first transport security protocol, vii) sending 864 the third data packet via the second network.

In short, the invention can be summarized as: The invention provides methods, devices and communication systems for establishing end-to-end secure connections and for securely communicating data packets. Such a communication system comprises a first device, an intermediate device and a second device. The first device communications via a first network, which is based on a first transport protocol and a first transport security protocol with the intermediate device. The second device communications via a second network, which is based on a second transport protocol and a second transport security protocol with the intermediate device. The intermediate device modifies packets received via first network to packets suitable for the second network, and vice versa. The first device is able to reconstruct a header of a received packet as if the packet was sent via the second network and its transport and security protocols. Further, the first device is able to verify, on basis of the reconstructed header, verification fields which are generated on basis of the second transport security protocol.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A communication system for securely communicating data packets between a first device and a second device, the communication system comprising:
    a first network being based on a first transport protocol,
    a first device being configured to communicate via the first network with other devices, the first device being configured to apply a first transport security protocol on top of the first transport protocol,
    a second network being based on a second transport protocol,
    a second device being configured to communicate via the second network with other devices, the second device being configured to apply a second transport security protocol on top of the second transport protocol,
    an intermediate device configured to communicate via the first network with the first device and configured to communicate via the second network with the second device, and being configured to modify data packets received via the first network which are generated in accordance to the first transport security protocol towards data packets for communication via the second network in accordance with the second transport security protocol, and vice versa, wherein
    the first transport protocol or the second transport protocol is a datagram based network protocol and the other one of the first transport protocol or the second transport protocol is a reliable connection oriented transport protocol,
    the first device is configured to reconstruct a header of a first data packet received from the intermediate device, the header corresponds to a header of a second packet communicated by the second device to the intermediate device and was modified by the intermediate device to the first data packet,
    the first device is configured to verify a security verification field of a received data packet on basis of the reconstructed header of the first data packet, the verification field being generated by the second device in accordance with the second transport security protocol,
    wherein the first device is configured to verify the security verification field in accordance with the first transport security protocol and if this verification is unsuccessful, the header of the first data packet is reconstructed and the security verification field is verified on basis of the reconstructed header of the first data packet in accordance with the second transport security protocol.

2. A communication system according to claim 1, wherein the first transport security protocol and the second transport security protocol initiate a secure communication session with a handshake protocol, and the received data packet is a data packet of the handshake protocol.

3. A communication system according to claim 1, wherein the received data packet comprises a message authenticating code (MAC) as a security verification field for authenticating the authenticity of the received data packet.

4. A communication system for securely communicating data packets between a first device and a second device, the communication system comprising:
    a first network being based on a first transport protocol,
    a first device being configured to communicate via the first network with other devices, the first device being configured to apply a first transport security protocol on top of the first transport protocol,
    a second network being based on a second transport protocol,
    a second device being configured to communicate via the second network with other devices, the second device being configured to apply a second transport security protocol on top of the second transport protocol,
    an intermediate device configured to communicate via the first network with the first device and configured to communicate via the second network with the second device, and being configured to modify data packets received via the first network which are generated in accordance to the first transport security protocol towards data packets for communication via the second network in accordance with the second transport security protocol, and vice versa, wherein
    the first transport protocol or the second transport protocol is a datagram based network protocol and the other one of the first transport protocol or the second transport protocol is a reliable connection oriented transport protocol,
    the first device is configured to reconstruct a header of a first data packet received from the intermediate device, the header corresponds to a header of a second packet that was communicated by the second device to the intermediate device and was modified by the intermediate device to the first data packet,
    the first device is configured to generate a security verification field for a third data packet to be sent, the security verification field being generated on basis of the reconstructed header of the first data packet and being generated in accordance with the second transport security protocol,
    wherein the first device is configured to verify the security verification field in accordance with the first transport security protocol and if this verification is unsuccessful, the header of the first data packet is reconstructed and the security verification field is verified on basis of the reconstructed header of the first data packet in accordance with the second transport security protocol.

5. A communication system according to claim 4, wherein the first transport security protocol and the second transport security protocol initiate a secure communication session with a handshake protocol, and the third data packet to be sent is a data packet of the handshake protocol.

6. A communication system according to claim 4, wherein the first device is configured to send a fourth data packet comprising a security verification field generated in accordance with the first transport security protocol and to send the third data packet comprising the security field generated in accordance with the second transport security protocol.

7. A communication system according to claim 4, wherein the first device is configured to detect whether the first device communicates with another device which applies the second transport security protocol, and wherein the first device is configured to send the third data packet comprising the security field generated in accordance with the second transport security protocol if the first device detected that it communicates with another device applying the second transport security protocol.

8. A communication system according to claim 1, wherein the first network transport communication protocol is the Internet Protocol based User Datagram Protocol, the second network transport communication protocol is the Internet Protocol based Transport Control Protocol, the first transport security protocol is the Datagram Transport Layer Security Protocol, and the second transport security protocol is the Transport Layer Security Protocol.

9. A communication system according to claim 1, wherein the first device is configured to apply the Constrained Application Protocol and the second device is configured to apply the Hypertext Transfer Protocol.

10. A first device for being used in a communication system according to claim 1, the first device comprising:
- a first network interface being configured to communicate via a first network with other devices, the first network being based on a first transport protocol, the first network protocol being a datagram based network protocol or a reliable connection oriented transport protocol,
- a first security protocol application means being configured to applying a first transport security protocol on top of the first transport protocol, wherein
- a reconstructor being configured to reconstruct a header of a first data packet received such that the header corresponds to a header of a second packet that was received by an intermediate device via a second network being based on a second transport protocol on top of which a second transport security protocol is being used, the first data packet being received from the intermediate device via the first network,
- a verificator being configured to verify a security verification field of a received data packet on basis of the reconstructed header of the first data packet, the verification field being generated in accordance with the second transport security protocol.

11. A first device for being used in a communication system according to claim 4, the first device comprising:
- a first network interface being configured to communicate via a first network with other devices, the first network being based on a first transport protocol, the first network protocol being a datagram based network protocol or a reliable connection oriented transport protocol,
- a first security protocol application means being configured to applying a first transport security protocol on top of the first transport protocol, wherein
- a reconstructor being configured to reconstruct a header of a received first data packet such that the header corresponds to a header of a second data packet that was received by an intermediate device via a second network being based on a second transport protocol on top of which a second transport security protocol is being used, the first data packet being received from the intermediate device via the first network,
- a generator being configured to generate a security verification field for a third data packet to be sent, the security verification field being generated on basis of the reconstructed header of the first data packet and being generated in accordance with the second transport security protocol.

12. An intermediate device for being applied in a communication system according to claim 4, the intermediate device comprising:
- a first network interface being configured to communicate via a first network with a first device, the first network being based on a first transport protocol,
- a second network interface being configured to communicate via a second network with a second device, the second network being based on a second transport protocol,
- a first security application means being configured to applying a first transport security protocol on top of the first transport protocol,
- a second security application means being configured to apply a second transport security protocol on top of the second transport protocol, the first or the second network protocol is a datagram based network protocol and the other one of the first or the second network protocol is a reliable connection oriented transport protocol, and
- a modificator being configured to modify data packets received via the first network and which are generated in accordance to the first transport security protocol towards data packets for communication via the second network in accordance with the second transport security protocol, and vice versa.

13. A method of securely communicating data packets between a first device and a second device, the method comprising:
- receiving a first data packet via a first network being based on a first transport protocol, a first transport security protocol being applied on top of the first transport protocol,
- modifying the first data packet to a second data packet to be sent via a second network being based on a second transport protocol, a second transport security protocol being applied on top of the second transport protocol, the first transport protocol or the second transport protocol is a datagram based network protocol and the other one of the first transport protocol or the second transport protocol is a reliable connection oriented transport protocol,
- sending the second data packet via the second network,
- receiving the second data packet,
- reconstructing a header of the second data packet received from the intermediate device such that the header corresponds to a header of the first packet,
- verify a security verification field of a received data packet on basis of the reconstructed header of the first data packet, the verification field being generated in accordance with the first transport security protocol, and if this verification is unsuccessful, the header of the first data packet is reconstructed and the security verification field is verified on basis of the reconstructed header of the first data packet in accordance with the second transport security protocol.

14. A method of securely communicating data packets between a first device and a second device, the method comprising:

receiving a first data packet via a first network being based on a first transport protocol, a first transport security protocol being applied on top of the first transport protocol, modifying the first data packet to a second data packet to be sent via a second network being based on a second transport protocol, a second transport security protocol being applied on top of the second transport protocol, the first transport protocol or the second transport protocol is a datagram based network protocol and the other one of the first transport protocol or the second transport protocol is a reliable connection oriented transport protocol, sending the second data packet via the second network, receiving the second data packet, reconstructing a header of the second data packet received from the intermediate device such that the header corresponds to a header of the first packet, generating a security verification field for a third data packet, the security verification field being generated on basis of the reconstructed header of the first data packet and being generated in accordance with the first transport security protocol, verifying the security verification field in accordance with the transport security protocol if this verification is unsuccessful, the header of the first data packet is reconstructed and the security verification field is verified on basis of the reconstructed header of the first data packet in accordance with the second transport security protocol, sending the third data packet via the second network.

* * * * *